(12) United States Patent
Eliash

(10) Patent No.: US 12,314,590 B2
(45) Date of Patent: *May 27, 2025

(54) INCOMPLETE SUPERBLOCK MANAGEMENT FOR MEMORY SYSTEMS

(71) Applicant: Micron Technology, Inc., Boise, ID (US)

(72) Inventor: Tomer Eliash, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,442

(22) Filed: Feb. 26, 2024

(65) Prior Publication Data

US 2024/0192879 A1 Jun. 13, 2024

Related U.S. Application Data

(63) Continuation of application No. 17/875,521, filed on Jul. 28, 2022, now Pat. No. 11,941,276.

(51) Int. Cl.
*G06F 3/06* (2006.01)

(52) U.S. Cl.
CPC ............ *G06F 3/064* (2013.01); *G06F 3/0604* (2013.01); *G06F 3/0629* (2013.01); *G06F 3/0679* (2013.01)

(58) Field of Classification Search
CPC ...... G06F 3/0604; G06F 3/064; G06F 3/0629; G06F 3/0679
USPC .................................................. 711/101, 103
See application file for complete search history.

(56) References Cited

U.S. PATENT DOCUMENTS

| 2012/0278533 | A1* | 11/2012 | Suzuki | G11C 16/3404 711/E12.008 |
| 2013/0054881 | A1* | 2/2013 | Ellis | G06F 12/0246 711/E12.008 |
| 2023/0104010 | A1* | 4/2023 | Hashimoto | G06V 20/56 707/736 |
| 2024/0036752 | A1 | 2/2024 | Eliash | |

* cited by examiner

*Primary Examiner* — Hashem Farrokh

(74) *Attorney, Agent, or Firm* — Schwegman Lundberg & Woessner, P.A.

(57) ABSTRACT

Aspects of the present disclosure configure a system component, such as a memory sub-system controller, to provide superblock management based on memory component reliabilities.

20 Claims, 6 Drawing Sheets

INCOMPLETE SUPERBLOCK MANAGEMENT FOR MEMORY SYSTEMS

PRIORITY APPLICATION

This application is a continuation of U.S. application Ser. No. 17/875,521, filed Jul. 28, 2022, which is incorporated herein by reference in its entirety.

TECHNICAL FIELD

Embodiments of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
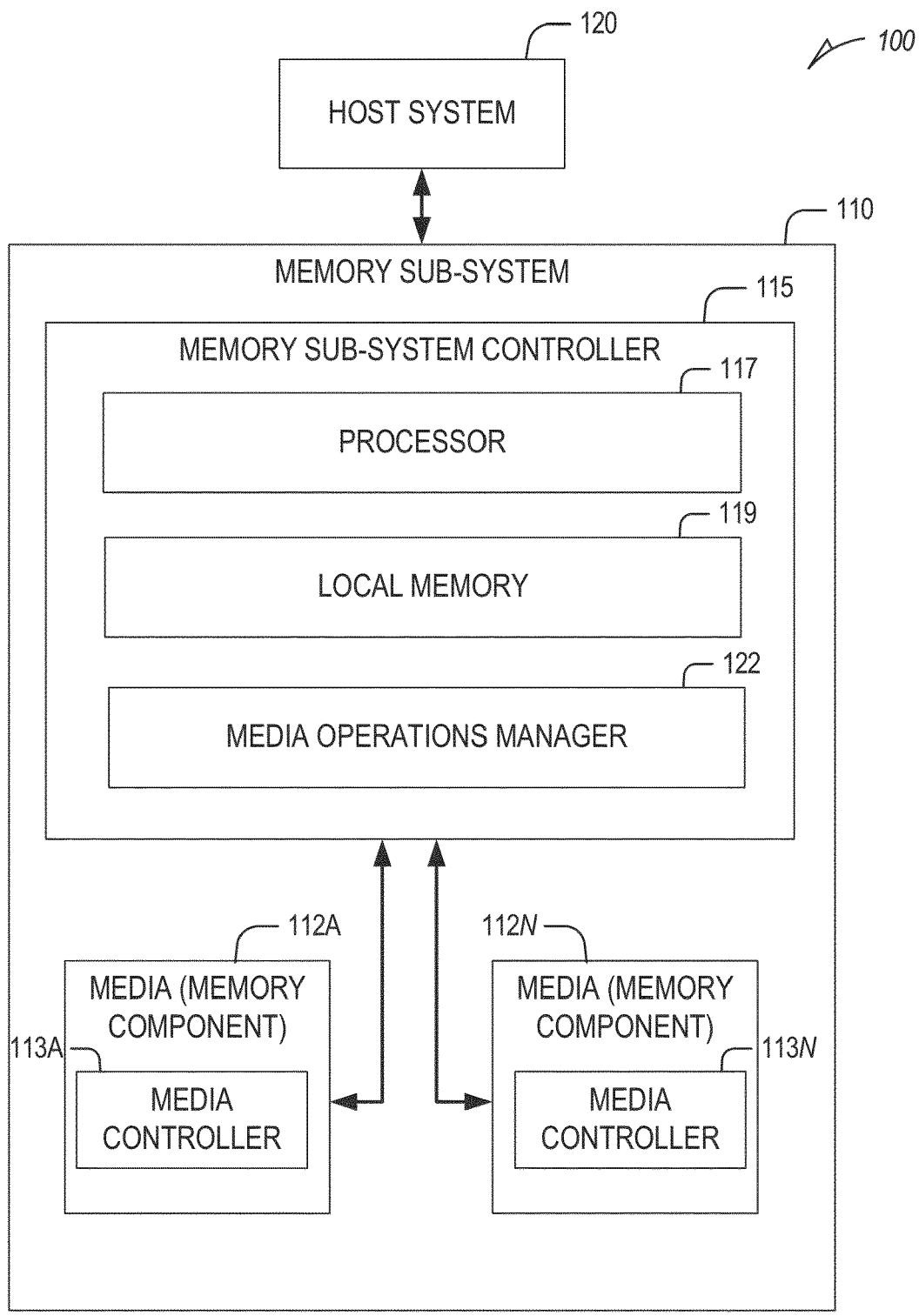
FIG. 1 is a block diagram illustrating an example computing environment including a memory sub-system, in accordance with some embodiments of the present disclosure.

Aspects of the present disclosure configure a system component, such as a memory sub-system controller, to perform memory operations on complete superblocks (CS) before incomplete superblocks (ICS). The memory sub-system controller can access configuration data associated with a set of memory components. The configuration data can include a table that associates individual groups of memory components with respective reliability grades that describe a data retention parameter, a read disturb parameter, an error rate, a leakage current, a cross temperature parameter, and/or an endurance parameter of the individual group of memory components. Based on configuration data (which can be stored on the memory components and/or a memory of the controller), the controller can group blocks of the set of memory components into complete superblocks and incomplete superblocks. Specifically, complete superblocks can include a set of blocks that each have a reliability grade above a threshold, and incomplete superblocks can include a first portion of blocks with reliability grades above the threshold and a second portion of blocks with reliability grades below a threshold. The controller can allocate (e.g., perform one or more memory operations on) the complete superblocks before the incomplete superblocks. Namely, once all of the complete superblocks have been allocated, then the controller can start allocating the incomplete superblocks. This ensures that performance of the memory system remains optimal by only allocating and performing memory operations on incomplete superblocks after all of the complete superblocks have been allocated. This improves the overall efficiency of operating the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations, such as a write operation, on host data that is stored on a memory device. For example, firmware of the memory sub-system may rewrite previously written host data from a location on a memory device to a new location as part of garbage collection management operations. The data that is rewritten, for example as initiated by the firmware, is hereinafter referred to as "garbage collection data." "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, and so forth.

Many different media management operations can be performed on a memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., negative-and (NAND) devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

There are challenges in efficiently managing or performing media management operations on typical memory devices. Specifically, certain memory devices, such as NAND flash devices, include large die-by-die reliability variation. As the technology for such memory devices continues to be scaled down, this die-by-die reliability variation becomes more pronounced and problematic in performing memory systems. Current memory systems (e.g., SSD drive or die package systems) associate all of the memory devices in the memory system with a certain reliability specification. In some cases, each block of each memory device is associated with a reliability grade or specification which is used to determine whether the block is a good block or a bad block. Good blocks are those that have reliability grades above a threshold and bad blocks are blocks that have reliability grades below a threshold. The reliability grades can be set at manufacture or during operation of the memory devices, such as by measuring the data retention and/or error rate associated with particular blocks.

Typical memory systems leverage superblocks, which are a collection of blocks across memory planes and/or dies. Namely, each superblock can be of equal size and can include a respective collection of blocks across multiple planes and/or dies. The superblocks, when allocated, allow a controller to simultaneously write data to a large portion of memory spanning multiple blocks (across multiple planes and/or dies) with a single address. Sometimes, superblocks include bad blocks or blocks that have reliability grades that are below a threshold. These can be referred to as incomplete superblocks. Typical systems allocate these incomplete superblocks in the same manner as complete superblocks (e.g., superblocks that include only good blocks that have reliability grades above the threshold). This usually results in poor memory performance as performing memory operations on incomplete superblocks can result in a greater quantity of errors or unreliable memory behavior. Also, some of the bad blocks in the incomplete superblocks cannot be used to perform memory operations. This further reduces the efficiency of allocating such incomplete superblocks because less memory space is available for performing memory operations (e.g., the memory operations can only be performed on the good blocks of the incomplete superblocks). As such, applying a one-size-fits-all approach to memory systems that have a mix of complete and incomplete superblocks is inefficient and results in poor or unreliable memory performance.

Aspects of the present disclosure address the above and other deficiencies by providing a memory controller that can allocate all of the complete superblocks before allocating incomplete superblocks to perform memory management operations on the respective memory components. For example, the memory controller can group a plurality of sets of blocks of the set of memory components into respective ones of a plurality of superblocks and determine that one or more blocks of an individual superblock of the plurality of superblocks are associated with a reliability grade that is lower than a threshold. In such cases, the memory controller designates the individual superblock as an incomplete superblock and performs one or more memory operations on a portion of the plurality of superblocks including complete superblocks before the incomplete superblock. The one or more memory operations can include at least one of a wear leveling operation, a data read or write operation, and/or a garbage collection operation. As a result, the memory controller can tailor the memory management operations to their particular reliability grades of the memory components without having to sacrifice performance by waiting to allocate incomplete superblocks until that additional space is needed (e.g., all of the complete superblocks have been allocated). This increases the efficiency of operating memory systems.

In some examples, the memory controller accesses configuration data. The configuration data includes a table that associates individual blocks of the set of memory components with respective reliability grades. The reliability grade describes at least one of a data retention parameter, a read disturb parameter, an error rate, a leakage current, a cross temperature parameter, and/or an endurance parameter. The memory controller can designate the incomplete superblocks based on the configuration data.

In some examples, the memory controller allocates each of the complete superblocks for storing data before allocating any blocks of the incomplete superblock. A first set of the plurality of sets of blocks of a first superblock can be distributed across multiple memory dies or memory planes. The memory controller can store a table that includes a first entry associating a first set of the plurality of sets of blocks with a first superblock address. The table can include a second entry associating a second set of the plurality of sets of blocks with a second superblock address. A total storage space can correspond to the plurality of superblocks including the incomplete superblock corresponding to an exported capacity of the memory sub-system.

In some examples, the memory controller can receive a request to perform a memory operation. In response, the memory controller determines that each of the plurality of superblocks excluding the incomplete superblock has been previously allocated and performs the memory operation on a set of blocks of the incomplete superblock. The memory controller allocates the incomplete superblock to the memory operation. In some cases, the incomplete superblock is a first incomplete superblock. In such cases, the memory controller determines that a first collection of blocks of a second superblock of the plurality of superblocks are associated with an individual reliability grade that is lower than the threshold, the second superblock including a second collection of blocks associated with individual reliability grades that transgress the threshold. The memory controller designates the second superblock as a second incomplete superblock.

In some examples, the memory controller determines a quantity of blocks of the first incomplete superblock that are associated with the reliability grade that is lower than the threshold and selects a group of the second collection of the blocks of the second incomplete superblock that corresponds to the quantity of blocks. For example, if the first incomplete superblock includes two bad blocks, the memory controller selects a group of two blocks from the good blocks of the second incomplete superblock. Then, the memory controller associates the selected group of the second collection of blocks with the first incomplete superblock. By doing so, the memory controller replaces the quantity of blocks of the first incomplete superblock with the selected group of the second collection of blocks. In some examples, the memory controller performs the memory operation on the first incomplete superblock in multiple passes. Namely, a first address of the first incomplete superblock is used in a first of the multiple passes and a second address of the second incomplete superblock is used in a second of the multiple passes.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies).

In some examples, the first memory component 112A, block or page of the first memory component 112A, or group of memory components including the first memory component 112A can be associated with a first reliability (capability) grade, value, or measure. The terms "reliability grade," "value," and "measure" are used interchangeably throughout and can have the same meaning. The second memory component 112N or group of memory components including the second memory component 112N can be associated with a second reliability (capability) grade, value, or measure. In some examples, each memory component 112A to 112N can store respective configuration data that specifies the respective reliability grade. In some examples, a memory or register can be associated with all of the memory components 112A to 112N that can store a table that maps different groups, bins, or sets of the memory components 112A to 112N to respective reliability grades.

In some embodiments, a block within the first memory component 112A can be grouped with a block within the second memory component 112N to form a superblock. Superblocks can be addressed collectively using a single address. In such cases, a table can store the association between the single address and each of the blocks of the first memory component 112A and second memory component 112N associated with that single address. In some embodiments, some of the blocks of the superblock can have reliability grades that are below a threshold. These can be referred to as bad blocks. When a superblock includes one or more bad blocks, the superblock is referred to as an incomplete superblock. A superblock that includes no bad blocks and only includes good blocks is referred to as a complete superblock.

In some embodiments, the memory sub-system 110 is a storage system. A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, and so forth.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a USB interface, a Fibre Channel interface, a Serial Attached SCSI (SAS) interface, and the like. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a NAND-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans memory components 112A to 112N can correspond to or be grouped as a first superblock and a single second row that spans memory components 112A to 112N can correspond to or be grouped as a second superblock. If the single first row includes all good blocks (e.g., each block in the single first row has a reliability grade above a threshold), the first superblock is a first complete superblock. If the single first row includes some bad blocks (e.g., one or more blocks in the single first row have a reliability grade below a threshold), the first superblock is a first incomplete superblock.

A memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, different near miss ECC operations, and/or different dynamic data refresh.

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include ROM for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112A to 112N. The configuration data can describe the reliability grades associated with different groups of the memory components 112A to 112N and/or different blocks within each of the memory components 112A to 112N. In some cases, the reliability grades are dynamic and can be updated by the memory sub-system controller 115 in response to determining that certain error rates are reached that transgress an error rate threshold. For example, a good block can become a bad block if that good block starts having error rates that transgress the threshold. In such cases, the configuration data is updated and any superblock that includes that now bad block is designated as an incomplete superblock.

The memory sub-system controller 115 can be responsible for other memory management operations, such as wear leveling operations, garbage collection operations, error detection and ECC operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to allocate all of the complete superblocks (superblocks without any bad blocks) before allocating incomplete superblocks (superblocks with at least one bad block) to perform memory operations on the respective memory components 112A to 112N. For example, the memory controller can group a plurality of sets of blocks of the set of memory components 112A to 112N into respective ones of a plurality of superblocks and determine that one or more blocks of an individual superblock of the plurality of superblocks are associated with a reliability grade that is lower than a threshold. In such cases, the memory controller designates the individual superblock as an incomplete superblock and performs one or more memory operations on the complete superblocks before the incomplete superblock. The one or more memory operations can include at least one of a wear leveling operation, a data read or write operation, and/or garbage collection operation. As a result, the memory controller can tailor the memory management operations to their particular reliability grades of the memory components without having to sacrifice performance by waiting to allocate incomplete superblocks until that additional space is needed (e.g., all of the complete superblocks have been allocated). This increases the efficiency of operating memory systems.

As an example, the media operations manager 122 can receive a request to perform one or more memory operations on the memory components 112A to 112N. In response, the media operations manager 122 can access a table of allocated superblocks to determine whether there exist any complete superblocks that have not been allocated. In response to identifying a complete superblock that has not yet been allocated, the media operations manager 122 allocates and performs the one or more memory operations on the identified complete superblock. In response to determining that all of the complete superblocks have been allocated, the media operations manager 122 selects one or more incomplete superblocks to allocate and perform the one or more memory operations. In some cases, the media operations manager 122 combines multiple incomplete superblocks to generate a pair of incomplete superblocks that together include the same quantity of good blocks as one of the complete superblocks. This increases the overall efficiency of operating the memory device.

Depending on the embodiment, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
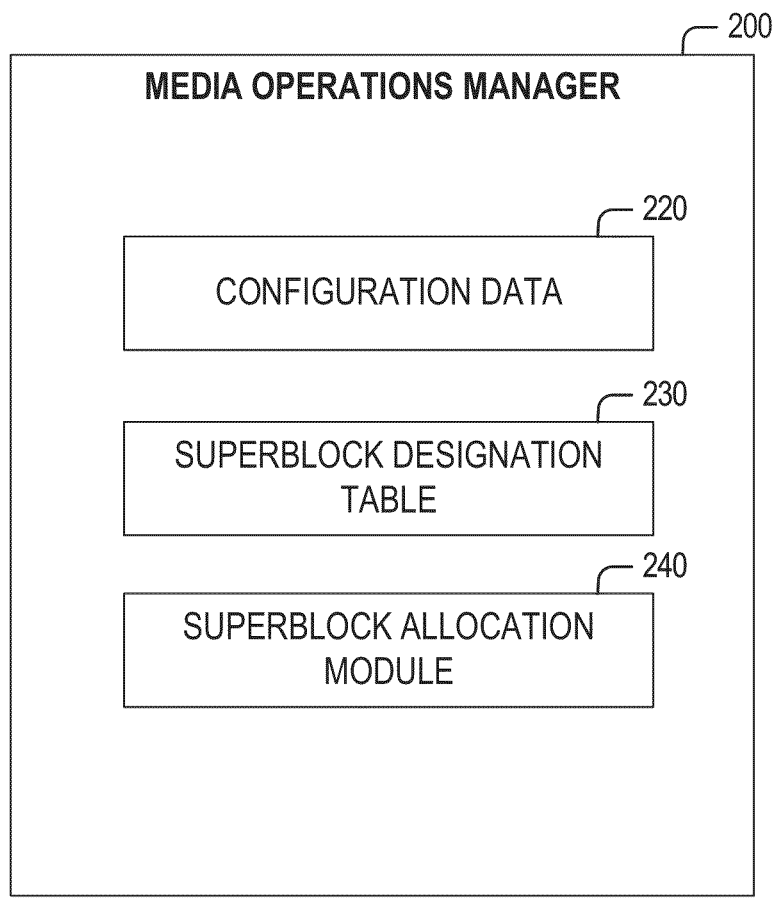
FIG. 2 is a block diagram of an example media operations manager, in accordance with some implementations of the present disclosure.

FIG. 2 is a block diagram of an example media operations manager 200, in accordance with some implementations of the present disclosure. As illustrated, the media operations manager 122 includes configuration data 220, a superblock designation table 230, and a superblock allocation module 240. For some embodiments, the media operations manager 122 can differ in components or arrangement (e.g., less or more components) from what is illustrated in FIG. 2.

The configuration data 220 accesses and/or stores configuration data associated with the memory components 112A to 112N. In some examples, the configuration data 220 is programmed into the media operations manager 122. For example, the media operations manager 122 can communicate with the memory components 112A to 112N to obtain the configuration data and store the configuration data 220 locally on the media operations manager 122. In some examples, the media operations manager 122 communicates with the host system 120. The host system 120 receives input from an operator or user that specifies parameters including reliability grades of different bins, groups, blocks, or sets of the memory components 112A to 112N. The media operations manager 122 receives configuration data from the host system 120 and stores the configuration data in the configuration data 220.

In some examples, the media operations manager 122 performs one or more test operations on different groups or blocks of the memory components 112A to 112N. The test operations are configured to determine reliability of each block of the memory components 112A to 112N. Based on a result of the test operations, the media operations manager 122 can store or update the reliability grades stored in the configuration data 220 for the different groups or blocks of memory components 112A to 112N. In some examples, the media operations manager 122 can periodically or routinely perform the test operations. The media operations manager 122 can determine that an individual memory component 112A is associated with a first reliability grade based on the configuration data 220. The media operations manager 122 can perform a set of test operations on the individual memory component 112A and can determine, based on a result of the test operations, that the reliability grade of the individual memory component 112A has increased or decreased and is now a second reliability grade. The media operations manager 122 can, in response, transition the individual memory components 112A from being associated with a first group of individual memory components 112A to 112N to a second group of individual memory components 112A to 112N that is associated with the second reliability grade.

Figure 3:
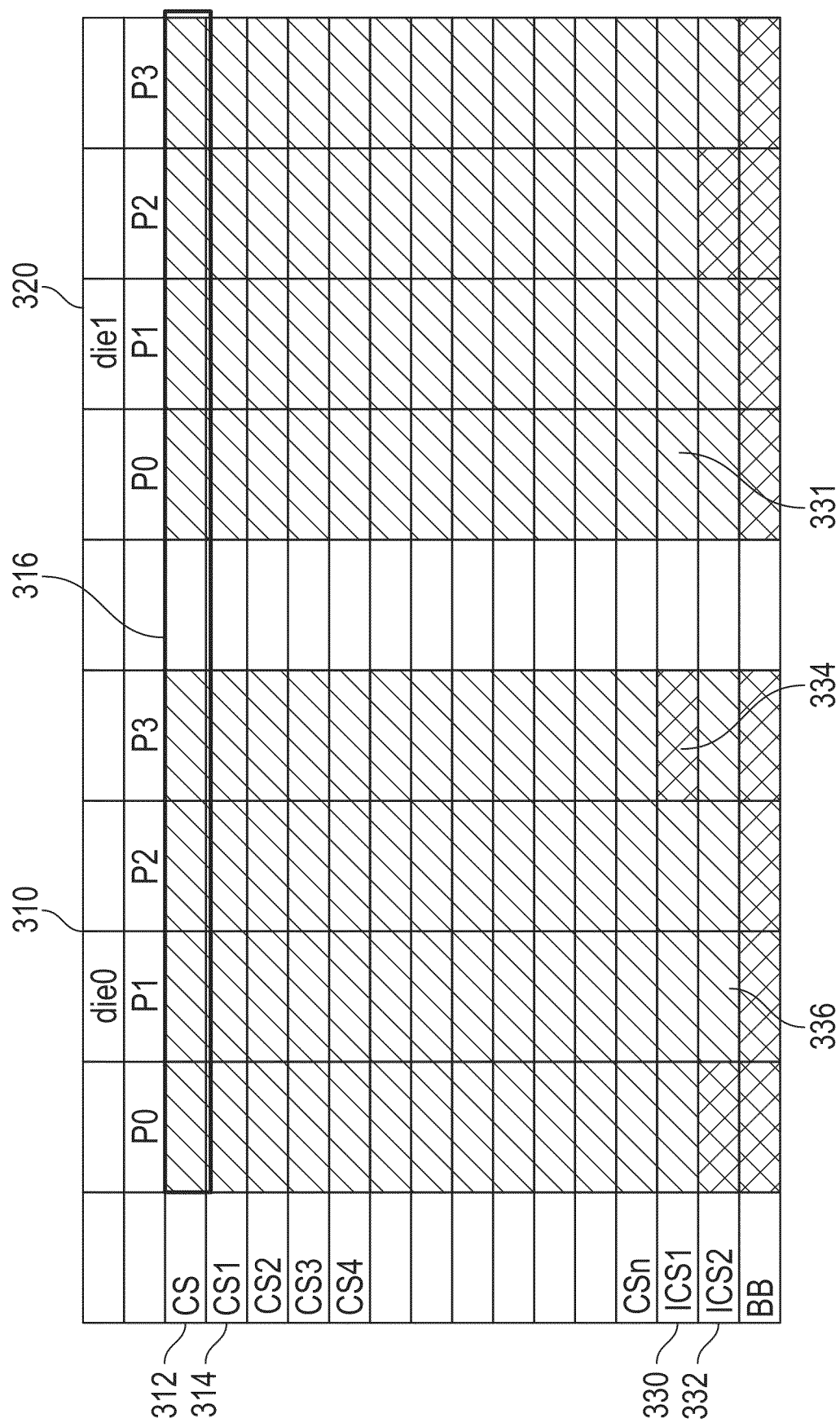
FIG. 3 is a block diagram of an example plurality of superblocks, in accordance with some implementations of the present disclosure.

In some examples, the media operations manager 122 processes the configuration data 220 to generate a superblock designation table 230 that lists addresses of complete superblocks and addresses of incomplete superblocks. For example, a first address in the table can be associated with a first row of good blocks across multiple dies or planes representing a first complete superblock. A second address in the table can be associated with a second row of good blocks across multiple dies or planes representing a second complete superblock. Specifically, as shown in FIG. 3, a configuration 300 of the memory components 112A to 112N is provided. The configuration includes a first die 310 (e.g., the first memory components 112A) and a second die 320 (e.g., the second memory components 112N).

The media operations manager 122 processes the configuration data 220 to determine that a first row 316 of blocks across the first die 310 and the second die 320 have a reliability grade that corresponds to a threshold (e.g., have error rates that are below a specified error rate threshold). In such cases, the media operations manager 122 stores a first complete superblock identifier 312 in the superblock designation table 230. The first complete superblock identifier 312 can include an address that accesses the entire first row 316 of blocks. Similarly, the media operations manager 122 associates a second complete superblock identifier 314 associated with another entire row of good blocks.

In some cases, the media operations manager 122 identifies a bad block 334 in an individual row of blocks of a superblock that also includes a set of good blocks 331. In response, the media operations manager 122 stores a first incomplete superblock identifier 330 in the superblock designation table 230. Similarly, the media operations manager 122 identifies a bad block in another individual row of blocks of another superblock that also includes a set of good blocks 336. In response, the media operations manager 122 stores a second incomplete superblock identifier 332 in the superblock designation table 230.

In some examples, the media operations manager 122 receives a request to perform a memory operation on the superblocks stored in the superblock designation table 230. In response, the superblock allocation module 240 searches the superblock designation table 230 to determine if there exist any unallocated complete superblocks. In response to identifying an individual complete superblock that has been unallocated, the superblock allocation module 240 stores an indicator in the superblock designation table 230 in association with the individual complete superblock that the individual complete superblock has been allocated. Also, the superblock allocation module 240 processes the requested memory operation on the individual complete superblock that has been allocated.

In some cases, the superblock allocation module 240 searches the superblock designation table 230 to determine that all of the complete superblocks have been allocated. In such cases, the superblock allocation module 240 identifies an incomplete superblock that has not been allocated. The superblock allocation module 240 stores an indicator in the superblock designation table 230 in association with the identified incomplete superblock that the identified incomplete superblock has been allocated. Also, the superblock allocation module 240 processes the requested memory operation on the identified incomplete superblock that has been allocated.

In some examples, the superblock allocation module 240 combines one incomplete superblock with a portion of another incomplete superblock to provide a superblock that includes the same number of good blocks as one of the previously allocated complete superblocks. To do so, the superblock allocation module 240 computes how many bad blocks are included in the identified incomplete superblock. For example, the superblock allocation module 240 can determine that the first incomplete superblock identifier 330 includes only one bad block 334. In such cases, the superblock allocation module 240 identifies another incomplete superblock, such as the second incomplete superblock identifier 332. The superblock allocation module 240 selects one good block 336 from the set of blocks grouped into the second incomplete superblock identifier 332. The superblock allocation module 240 replaces the bad block 334 from the set of blocks grouped into the first incomplete superblock identifier 330 with the good block 336. Namely, the superblock allocation module 240 stores, in the superblock designation table 230, the list of identifiers or addresses of each good block in the row of blocks associated with the first incomplete superblock identifier 330 and the address or identifier of the selected good block 336 of the second incomplete superblock identifier 332. When a request to perform an operation on the first incomplete superblock identifier 330 is received, the request is performed in two phases. The first phase includes first operating on all of the blocks of the row associated with the first incomplete superblock identifier 330 and the second phase includes operating on the single good block 336 of the second incomplete superblock identifier 332.

Figure 4:
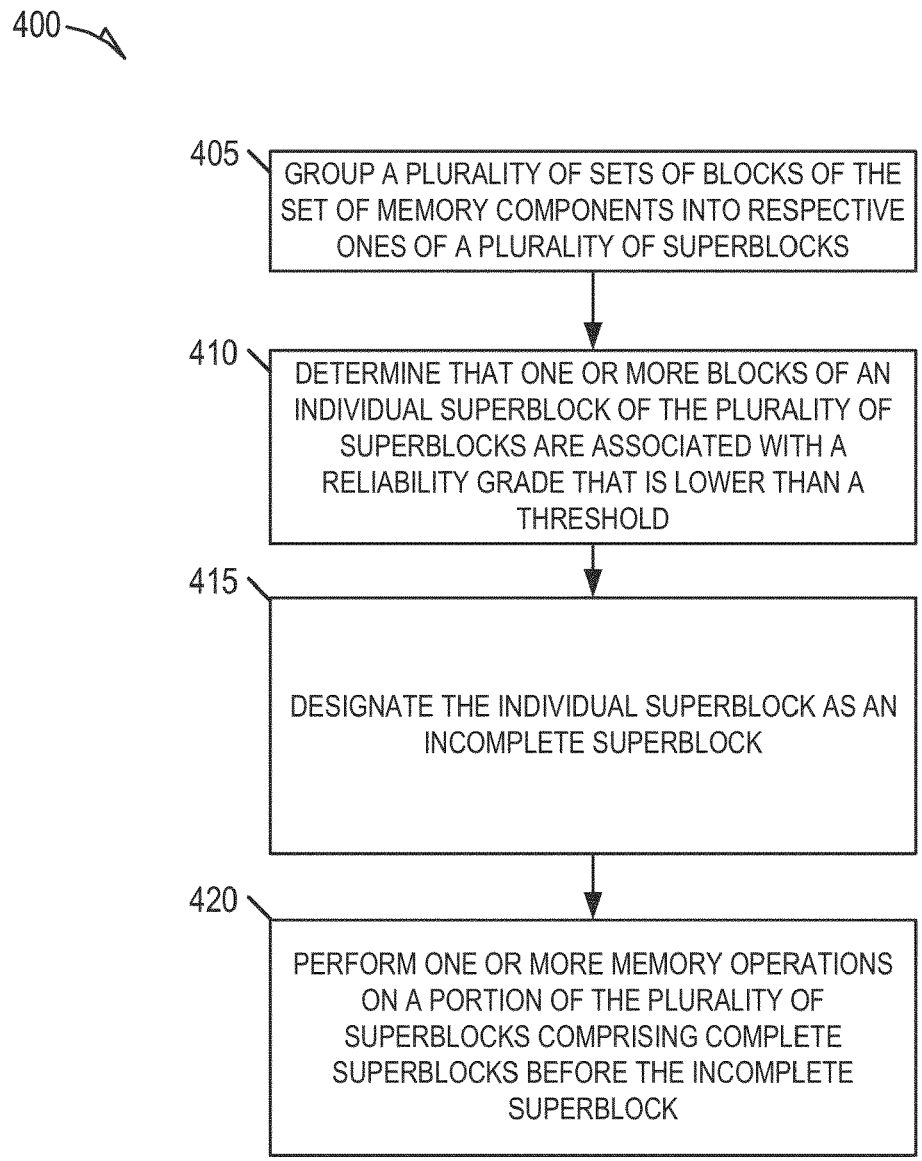
FIG. 4 is a flow diagram of an example method to perform memory operations on a plurality of superblocks before an incomplete superblock, in accordance with some implementations of the present disclosure.

FIG. 4 is a flow diagram of an example method 400 to perform memory operations on a plurality of superblocks before an incomplete superblock, in accordance with some implementations of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the media operations manager 122 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now FIG. 4, the method (or process) 400 begins at operation 405, with a media operations manager 122 of a memory sub-system (e.g., memory sub-system 110) grouping a plurality of sets of blocks of the set of memory components into respective ones of a plurality of superblocks. Then, at operation 410, the media operations manager 122 of the memory sub-system determines that one or more blocks of an individual superblock of the plurality of superblocks are associated with a reliability grade that is lower than a threshold. Thereafter, at operation 415, the media operations manager 122 designates the individual superblock as an incomplete superblock. The media operations manager 122, at operation 420, performs one or more memory operations on a portion of the plurality of superblocks comprising complete superblocks before the incomplete superblock.

Figure 5:
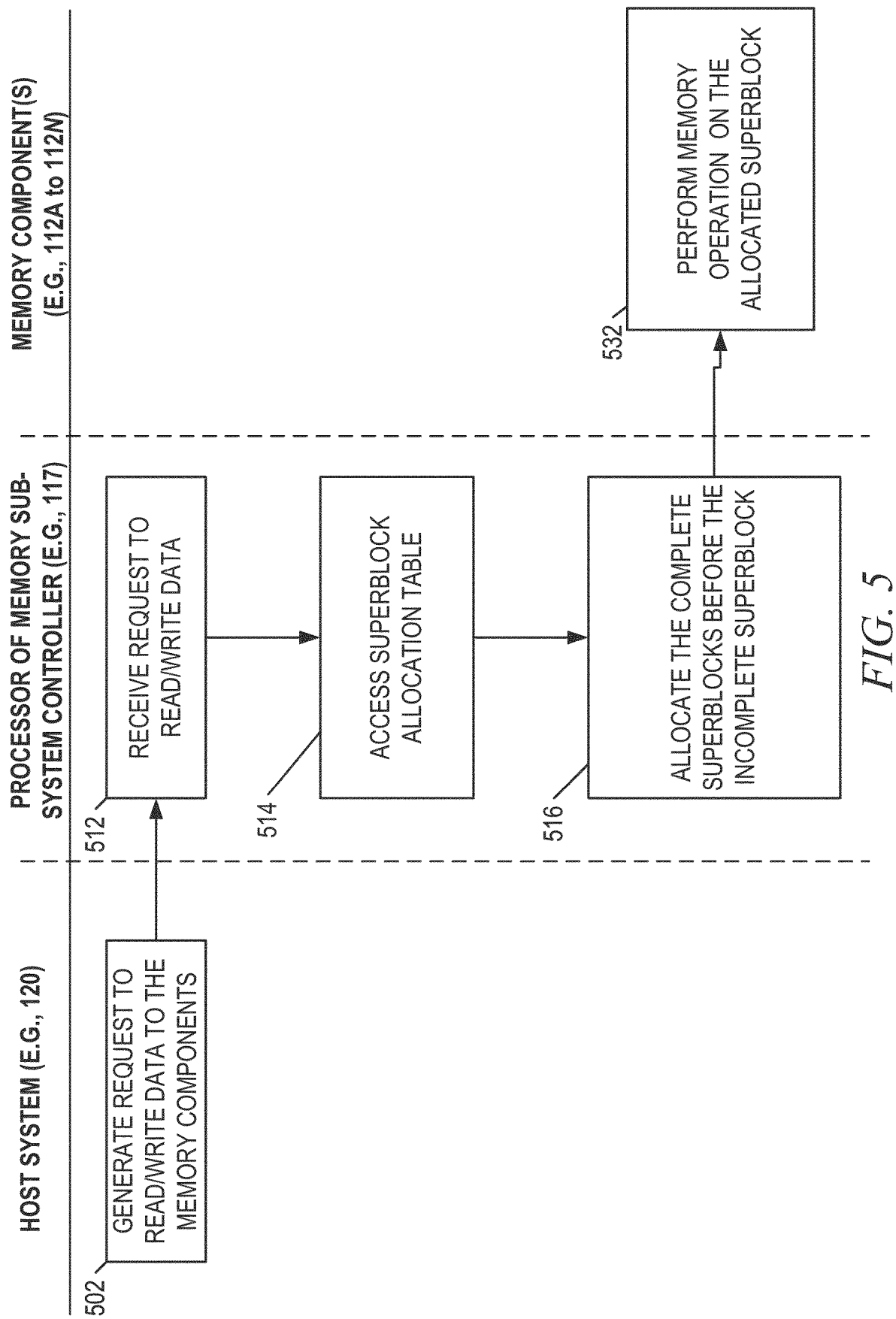
FIG. 5 provides an interaction diagram illustrating interactions between components of the computing environment in the context of some embodiments in which a media operations manager is used.

FIG. 5 provides an interaction diagram illustrating interactions between components of the computing environment 100 in the context of some embodiments. The operations of the method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the memory sub-system controller 115 and/or by the media operations manager 122. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIG. 5, the host system can comprise the host system 120, the processor of the memory sub-system controller can comprise the processor 117 of the memory sub-system 110, and the one or more memory components can comprise at least one of the memory components 112A to 112N.

As shown in FIG. 5, at operation 502, the host system (e.g., via a processor of the host system 120) generates a request to read/write data to the memory components and, at operation 512, the processor of the memory sub-system controller receives the request. The processor of the memory sub-system controller generates instructions to access a superblock allocation table, such as the superblock designation table 230, at operation 514. The processor of the memory sub-system controller generates instructions to allocate the plurality of superblocks that are complete superblocks before allocating any of the incomplete superblocks at operation 516.

The processor of the memory sub-system controller then performs the requested read/write data operations on the allocated superblock (e.g., the complete superblock, the incomplete superblock, and/or multiple combined incomplete superblocks). The memory components 112A to 112N receive the instructions and, at operation 532, the memory components 112A to 112N receive and store the user data in the superblocks.

In view of the disclosure above, various examples are set forth below. It should be noted that one or more features of an example, taken in isolation or combination, should be considered within the disclosure of this application.

Example 1: a system comprising: a set of memory components of a memory sub-system; and a processing device operatively coupled to the set of memory components, the processing device being configured to perform operations comprising: grouping a plurality of sets of blocks of the set of memory components into respective ones of a plurality of superblocks; determining that one or more blocks of an individual superblock of the plurality of superblocks are associated with a reliability grade that is lower than a threshold; designating the individual superblock as an incomplete superblock; and performing one or more memory operations on a portion of the plurality of superblocks comprising complete superblocks before the incomplete superblock.

Example 2: the system of Example 1 wherein the operations comprise accessing configuration data, wherein the configuration data comprises a table that associates individual blocks of the set of memory components with respective reliability grades.

Example 3: the system of Examples 1 or 2, wherein the reliability grade describes at least one of a data retention parameter, a read disturb parameter, an error rate, a leakage current, a cross temperature parameter, or an endurance parameter.

Example 4: the system of any one of Examples 1-3, wherein the operations comprise allocating each of the complete superblocks for storing data before allocating any blocks of the incomplete superblock.

Example 5: the system of any one of Examples 1-4, wherein a first set of the plurality of sets of blocks of a first superblock is distributed across multiple memory dies.

Example 6: the system of any one of Examples 1-5, wherein a first set of the plurality of sets of blocks of a first superblock is distributed across multiple memory planes.

Example 7: the system of any one of Examples 1-6, wherein the operations comprise storing a table, the table comprising a first entry associating a first set of the plurality of sets of blocks with a first superblock address, and the table comprising a second entry associating a second set of the plurality of sets of blocks with a second superblock address.

Example 8: the system of any one of Examples 1-7, wherein a total storage space corresponding to the plurality of superblocks including the incomplete superblock corresponds to an exported capacity of the memory sub-system.

Example 9: the system of any one of Examples 1-8, wherein the one or more memory operations comprise at least one of a wear leveling operation, a data read or write operation, or a garbage collection operation.

Example 10: the system of any one of Examples 1-9, wherein the operations comprise: receiving a request to perform a memory operation; determining that each of the plurality of superblocks excluding the incomplete superblock has been previously allocated; and in response to determining that each of the plurality of superblocks excluding the incomplete superblock has been previously allocated, performing the memory operation on a set of blocks of the incomplete superblock.

Example 11: the system of Example 10, wherein the operations comprise: allocating the incomplete superblock to the memory operation.

Example 12: the system of Example 10, wherein the incomplete superblock is a first incomplete superblock, and wherein the operations comprise: determining that a first collection of blocks of a second superblock of the plurality of superblocks are associated with an individual reliability grade that is lower than the threshold, the second superblock comprising a second collection of blocks associated with individual reliability grades that transgress the threshold; and designating the second superblock as a second incomplete superblock.

Example 13: the system of Example 12, wherein the operations comprise: determining a quantity of blocks of the first incomplete superblock that are associated with the reliability grade that is lower than the threshold; selecting a group of the second collection of the blocks of the second incomplete superblock that corresponds to the quantity of blocks; and associating the selected group of the second collection of blocks with the first incomplete superblock.

Example 14: the system of Example 13, wherein the operations comprise: replacing the quantity of blocks of the first incomplete superblock with the selected group of the second collection of blocks.

Example 15: the system of Example 14, wherein the operations comprise: performing the memory operation on the first incomplete superblock in multiple passes, wherein a first address of the first incomplete superblock is used in a first of the multiple passes, and wherein a second address of the second incomplete superblock is used in a second of the multiple passes.

Methods and computer-readable storage medium with instructions for performing any one of the above Examples.

Figure 6:
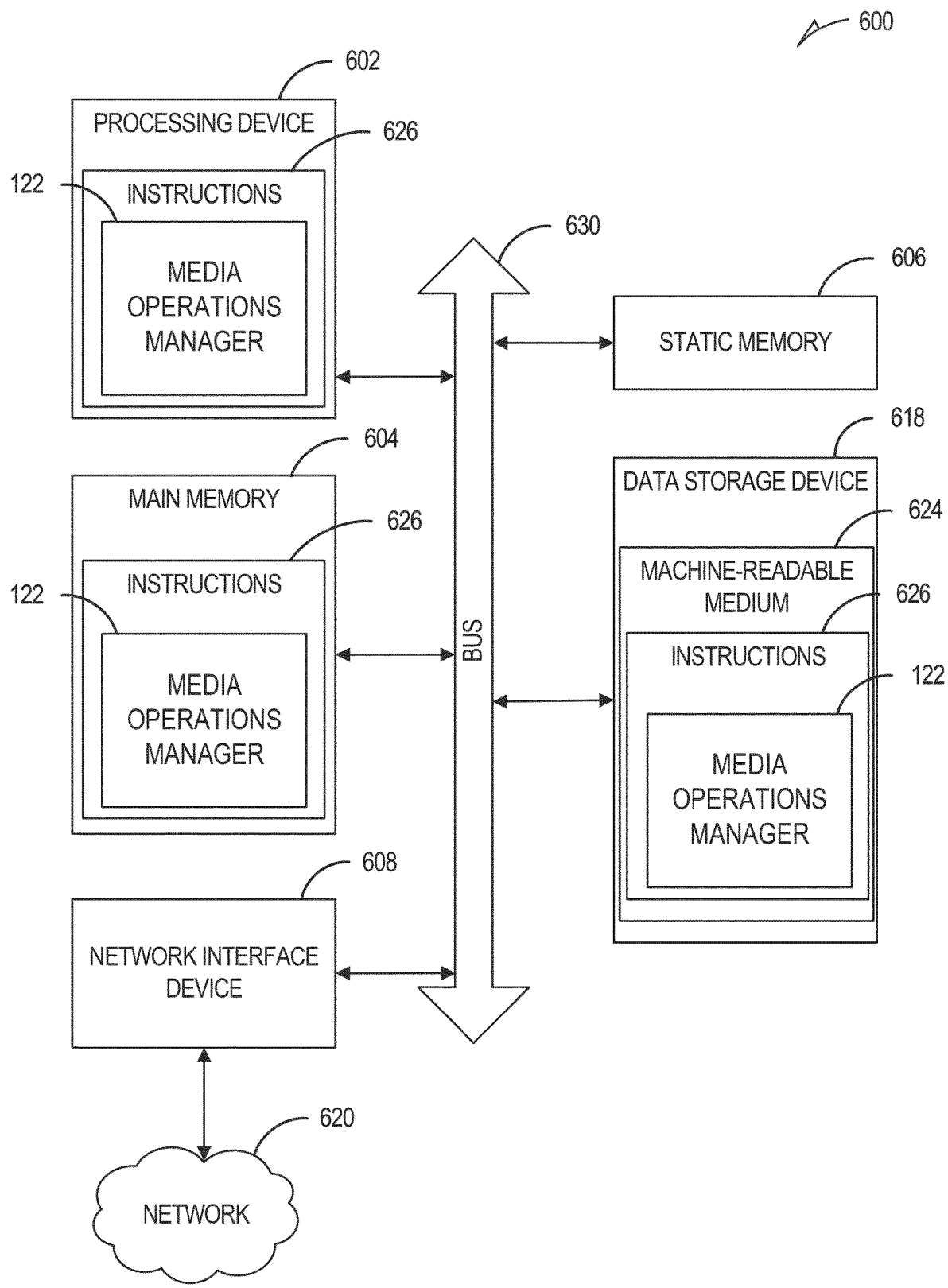
FIG. 6 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an ASIC, a FPGA, a digital signal processor (DSP), a network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 implement functionality corresponding to the media operations manager 122 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; ROMs; RAMs; erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a set of memory components of a memory sub-system; and
    a processing device operatively coupled to the set of memory components, the processing device being configured to perform operations comprising:
    determining that one or more blocks of an individual superblock fail to satisfy a reliability criterion;
    designating the individual superblock as an incomplete superblock; and
    performing one or more memory operations on a portion of one or more complete superblocks before the incomplete superblock.

2. The system of claim 1, the operations comprising:
    grouping a plurality of sets of blocks of the set of memory components into respective ones of a plurality of superblocks, the reliability criterion comprising a reliability grade that is lower than a threshold.

3. The system of claim 2, wherein the reliability grade describes at least one of a data retention parameter, a read disturb parameter, an error rate, a leakage current, a cross temperature parameter, or an endurance parameter.

4. The system of claim 1, wherein the operations comprise allocating each of complete superblocks for storing data before allocating any blocks of the incomplete superblock.

5. The system of claim 1, wherein a first set of a plurality of sets of blocks of a first superblock is distributed across multiple memory dies.

6. The system of claim 1, wherein a first set of a plurality of sets of blocks of a first superblock is distributed across multiple memory planes.

7. The system of claim 1, wherein the operations comprise storing a table, the table comprising a first entry associating a first set of a plurality of sets of blocks with a first superblock address, and the table comprising a second entry associating a second set of the plurality of sets of blocks with a second superblock address.

8. The system of claim 1, wherein a total storage space corresponding to a plurality of superblocks including the incomplete superblock corresponds to an exported capacity of the memory sub-system.

9. The system of claim 1, wherein the one or more memory operations comprise at least one of a wear leveling operation, a data read or write operation, or a garbage collection operation.

10. The system of claim 1, wherein the operations comprise:
receiving a request to perform a memory operation;
determining that each of the complete superblocks excluding the incomplete superblock has been previously allocated; and
in response to determining that each of the complete superblocks excluding the incomplete superblock has been previously allocated, performing the memory operation on a set of blocks of the incomplete superblock.

11. The system of claim 10, wherein the operations comprise:
allocating the incomplete superblock to the memory operation.

12. The system of claim 10, wherein the incomplete superblock is a first incomplete superblock, and wherein the operations comprise:
determining that a first collection of blocks of a second superblock of a plurality of superblocks is associated with an individual reliability grade that is lower than a threshold, the second superblock comprising a second collection of blocks associated with individual reliability grades that transgress the threshold; and
designating the second superblock as a second incomplete superblock.

13. The system of claim 12, wherein the operations comprise:
determining a quantity of blocks of the first incomplete superblock that are associated with a reliability grade that is lower than the threshold;
selecting a group of the second collection of the blocks of the second incomplete superblock that corresponds to the quantity of blocks; and
associating the selected group of the second collection of blocks with the first incomplete superblock.

14. The system of claim 13, wherein the operations comprise:
replacing the quantity of blocks of the first incomplete superblock with the selected group of the second collection of blocks.

15. The system of claim 14, wherein the operations comprise:
performing the memory operation on the first incomplete superblock in multiple passes, wherein a first address of the first incomplete superblock is used in a first of the multiple passes, and wherein a second address of the second incomplete superblock is used in a second of the multiple passes.

16. A computerized method comprising:
determining that one or more blocks of an individual superblock fail to satisfy a reliability criterion;
designating the individual superblock as an incomplete superblock; and
performing one or more memory operations on a portion of one or more complete superblocks before the incomplete superblock.

17. The method of claim 16, further comprising:
accessing configuration data, wherein the configuration data comprises a table that associates individual blocks of a set of memory components with respective reliability grades.

18. The method of claim 17, wherein the reliability grades describes at least one of a data retention parameter, a read disturb parameter, an error rate, a leakage current, a cross temperature parameter, or an endurance parameter.

19. A non-transitory computer-readable storage medium comprising instructions that, when executed by a processing device, cause the processing device to perform operations comprising:
determining that one or more blocks of an individual superblock fail to satisfy a reliability criterion;
designating the individual superblock as an incomplete superblock; and
performing one or more memory operations on a portion of one or more complete superblocks before the incomplete superblock.

20. The non-transitory computer-readable storage medium of claim 19, the operations comprising accessing configuration data, wherein the configuration data comprises a table that associates individual blocks of a set of memory components with respective reliability grades.

* * * * *